(12) United States Patent
Yong et al.

(10) Patent No.: US 12,104,065 B2
(45) Date of Patent: Oct. 1, 2024

(54) PREPARING METHOD FOR BRANCHED VEGETABLE OIL-BASED PHOTOSENSITIVE RESIN AND UV CURING GLASS INK

(71) Applicant: China West Normal University, Sichuan (CN)

(72) Inventors: Qiwen Yong, Nanchong (CN); Zhihui Xie, Nanchong (CN); Yuzi Yang, Nanchong (CN)

(73) Assignee: China West Normal University, Nanchong (CN)

( * ) Notice: Subject to any disclaimer, the term of this patent is extended or adjusted under 35 U.S.C. 154(b) by 0 days.

(21) Appl. No.: 18/492,537

(22) Filed: Oct. 23, 2023

(65) Prior Publication Data
US 2024/0166899 A1 May 23, 2024

(30) Foreign Application Priority Data
Nov. 3, 2022 (CN) .......................... 202211372119.2

(51) Int. Cl.
| | |
|---|---|
| *C09D 11/101* | (2014.01) |
| *C03C 19/00* | (2006.01) |
| *C09D 11/037* | (2014.01) |
| *C09D 11/107* | (2014.01) |

(52) U.S. Cl.
CPC ............ *C09D 11/101* (2013.01); *C03C 19/00* (2013.01); *C09D 11/037* (2013.01); *C09D 11/107* (2013.01); *C03C 2217/29* (2013.01); *C03C 2217/72* (2013.01)

(58) Field of Classification Search
CPC ... C09D 11/101; C09D 11/037; C09D 11/107; C03C 19/00; C03C 2217/29; C03C 2217/72
See application file for complete search history.

(56) References Cited

FOREIGN PATENT DOCUMENTS

| | | |
|---|---|---|
| CN | 106519954 A | 3/2017 |
| CN | 106832196 A | 6/2017 |
| CN | 107987611 A | 5/2018 |
| CN | 114853972 A | 8/2022 |

OTHER PUBLICATIONS

Yuan et al., machine English translation of CN107987611 (Year: 2018).*

* cited by examiner

*Primary Examiner* — Jessica M Roswell

(57) ABSTRACT

The invention provides a preparing method for branched vegetable oil-based photosensitive resin and UV curing glass ink. The UV curing ink includes A component and B component. A branched vegetable oil-based photosensitive resin is used as the ink binder in the ink, this resin has the inherent flexibility of vegetable oil molecular segments, and at the same time has the high activity and increased cross-linking density of multifunctional polyurethane acrylate photosensitive resin, especially the introduction of a large number of urethane bonds, is beneficial to improving the toughness, hardness and adhesion of the ink, giving the ink excellent acid and alkali resistance, and improving the application of renewable resources in the field of ink. By introducing adhesion promoters and heat-curing components, the ink and glass substrate are connected as a whole, further improving the adhesion of the ink on the substrate.

6 Claims, 7 Drawing Sheets

PREPARING METHOD FOR BRANCHED VEGETABLE OIL-BASED PHOTOSENSITIVE RESIN AND UV CURING GLASS INK

FIELD OF THE INVENTION

The present invention relates to the field of photocurable ink industry, and in particular to a preparing method for branched vegetable oil-based photosensitive resin and UV curing glass ink.

BACKGROUND OF THE INVENTION

Ultraviolet (UV) curable ink uses a specific band of ultraviolet light to irradiate an initiator in the ink to generate active free radicals, which triggers a free radical polymerization reaction in the photosensitive resin, causing the ink to instantly change from liquid to solid. Compared with other curing methods, UV curing technology has unique "5E" advantages, such as efficient, environmental friendly, energy saving, economical, and enabling. In recent years, the rapid development of UV curing silk screen printing ink, UV curing offset printing ink, UV curing flexo printing ink, UV curing embossing ink, UV curing gravure ink, UV curing transfer printing ink, and UV curing inkjet ink are zero-emission green ink, and has gradually replaced traditional solvents. In the past ten years, UV curable inks have been widely used in the printing of glass, metal, ceramics, paper, manicure, and plastic products to achieve beautification and protection functions.

As people's aesthetic requirements increase, printing decorative and protective inks on glass substrates has become an increasingly common fashion choice. The main component of glass is silicic acid, which is an amorphous solid with an irregular structure. The surface is smooth and hard, and UV ink is difficult to penetrate, making the adhesion of the ink coating on the glass relatively poor. It is resistant to water, acid, alkali and alkali, thus it is difficult to meet the requirements for organic solvent properties. Currently, among optical UV glass inks, epoxy acrylate (EA) is the most widely used photosensitive resin, it has excellent comprehensive properties, but it also has the disadvantages of poor flexibility, easy brittleness, and poor resistance to boiling water. In particular, the internal stress generated during the instant curing of UV ink cannot be released, which is also the reason why it is difficult for the ink to adhere to the glass. Solving the balance between hardness, flexibility, adhesion and other properties is a difficult problem that inks must solve in the field of high-end glass bottles.

With the increasing shortage of petrochemical resources and the rising price of oil, the preparation of new materials from renewable resources has become a current hot topic. Among many vegetable oils, soybeans are the most widely planted, and with the expansion of the planting scale of genetically modified soybean oil, the production of soybean oil is rising year by year. The molecular structure of soybean oil is rich in carbon-carbon double bonds and ester groups, and functional groups such as acrylate groups, epoxy groups, carboxyl groups, and hydroxyl groups can be introduced under the action of catalysts, providing a better basis and more options for further modification to prepare soybean oil-based composite materials, thus more alternatives to traditional petroleum-based products. Epoxy soybean oil acrylate (AESO) is a photosensitive macromonomer obtained by acrylation of epoxy soybean oil, it can be used in the fields of UV curing coatings, adhesives and inks to partially replace petroleum-based photosensitive materials to toughen and cost reduction effect. However, the poor hardness and adhesion of AESO as a film-forming material hinder its large-scale application on glass, metal, ceramics and other substrates.

Therefore, a branched vegetable oil-based photosensitive resin was developed, which has both a flexible chain core of vegetable oil molecules and a high-functionality polyurethane acrylate active terminal. It can not only overcome the shortcomings of low hardness and poor adhesion of AESO, but also make up for the high brittleness of EA. It is an effective method to improve the use of renewable raw materials in the field of UV curing glass ink.

SUMMARY OF THE INVENTION

The purpose of the present invention is to solve the deficiencies of existing UV curing glass inks and provide a preparing method for branched vegetable oil photosensitive resin and UV curing glass ink. The ink has high photosensitive resin content, strong adhesion, resistance to boiling water and acid and alkali resistance.

The present invention adopts the following technical solutions:

A branched vegetable oil-based photosensitive resin, its structure is as follows:

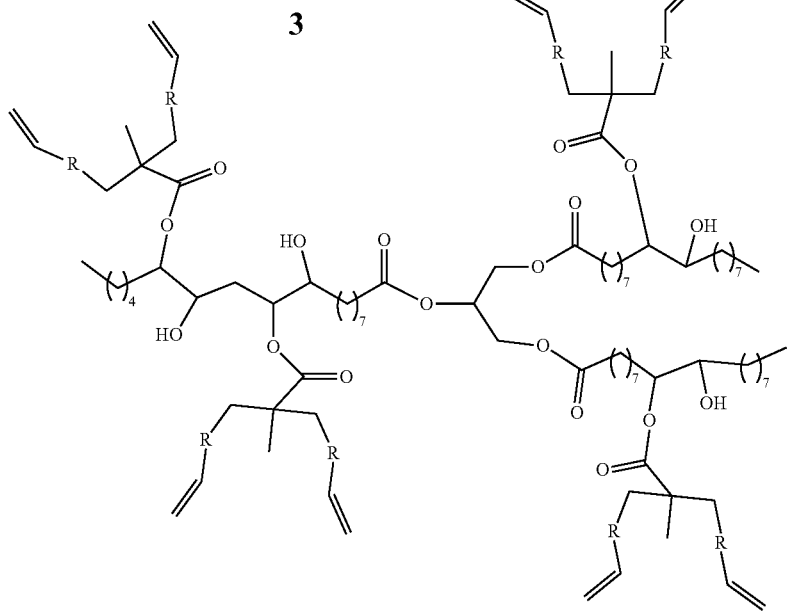

A preparing method of branched vegetable oil-based photosensitive resin includes the following steps:

Step (1), take 12.2 g epoxidized soybean oil, 6.71 g 2,2-bishydroxymethylpropionic acid and 0.06 g tetrabutylammonium bromide catalyst and put into a three-necked bottle, stir mechanically, and react in a constant temperature oil bath at 120° C. for 6-8 hours, a brown viscous substance ESOD is obtained, which is dissolved in 20 g of 1,4-dioxane solvent to obtain an ESOD solution for later use.

Step (2), take 22.23 g isophorone diisocyanate, 0.15 g p-hydroxyanisole, polymerization inhibitor, 0.02 g dibutyltin dilaurate catalyst and 30 g 1,4-dioxane and put into a three-necked bottle, then 11.61 g of hydroxyethyl acrylate was added dropwise into the above reaction bottle through a constant pressure dropping funnel within 30 minutes, stirred mechanically, protected by nitrogen, and reacted in a constant temperature oil bath at 40° C. for 4 hours to obtain the intermediate product IPDI-HEA.

Step (3), add the ESOD solution obtained by the reaction in step 1 dropwise into the reaction bottle of step (2) within 30 minutes through a constant pressure dropping funnel, raise the temperature to 70° C., continue the reaction for 5 hours under nitrogen protection, and rotary evaporate the solvent, finally, a reddish-brown transparent viscous liquid product is obtained, which is a branched vegetable oil-based photosensitive resin.

A preparing method for preparing method for UV curing glass ink of branched vegetable oil-based photosensitive resin, includes the following steps:

Step 1, prepare materials for component A ink, in terms of mass g, the ink component A comprising the following components:

branched vegetable oil-based photosensitive resin 25-35 g;
active diluent 20-35 g;
photoinitiator 5-10 g;
adhesion promoter 1-4 g;
auxiliary agent 2-4 g;
epoxy resin 5-15 g; and
pigment and filler 10-20 g;

Step 2, preparation of component A, comprising the following operations performed in a darkroom: step 201, add the branched vegetable oil-based photosensitive resin, active diluent, photoinitiator, adhesion promoter, auxiliary agent, and epoxy resin in step 1 into a container, and stir mechanically to obtain a uniform mixed solution; step 202, add the pigments and fillers in step 1 to the mixed solution in step 201, stir at low speed to disperse evenly, and transfer to a ceramic three-roller grinder to grind until the fineness is less than 5 μm; and step 203, divide the fluid paste obtained by grinding in step 202 into a black plastic jar for sealing and storage, obtaining component A.

Step 3, prepare materials for component B ink, in terms of mass g, the ink component B comprising the following components: adhesion promoter 80 g; and imidazoles 20 g.

Step 4, preparation of component B, comprising the following steps: add the adhesion promoter and imidazole compound in step 3 into the container according to the measured amount, stir mechanically until uniform, then divide into a black plastic bottle for sealing and storage, obtaining component B.

Step 5, preparation of UV curing glass ink: component A and component B are mixed evenly in a mass ratio of 100:5-8 and left to stand for 5 minutes, then they are printed on a substrate material with a 300-400 mesh screen, using an LED-UV light source with a wavelength of 395±10 nm, the optical power is 1500 mJ/cm2, light-curing for 3-5 s, and then baked at 160±10° C. for 20 min to obtain fully cured ink;

The adhesion promoter is one of 2-hydroxyethyl methacrylate phosphate, 2-hydroxyethyl methacrylate phosphate, γ-methacryloyloxypropyltrimethoxysilane, γ-amine Propyltriethoxysilane, γ-aminopropyltrimethoxysilane, N-β-(aminoethyl)γ-aminopropyltriethoxysilane coupling agent, N-β-(aminoethyl)γ-aminopropyltrimethoxysilane coupling agents, or a combination of any two thereof.

The epoxy resin is one of bisphenol A type epoxy resins E51 and E54, or a combination thereof.

Beneficial Effects of the Present Invention (1). The present invention prepares soybean-based polyol (ESOD) in one step through a solvent-free method, and introduces a photosensitive group to modify it to obtain a branched vegetable oil-based photosensitive resin (ESOD- IH). The synthesis process is simple and the yield is high, conducive to industrialized production.

(2). Use branched vegetable oil-based photosensitive resin as the ink binder. This resin has the inherent characteristics of the flexibility of vegetable oil molecular segments, and at the same time has the high activity and increased cross-linking density of multifunctional polyurethane acrylate photosensitive resin, especially the introduction of a large number of urethane bonds, is beneficial to improving the toughness, hardness and adhesion of the ink, giving the ink excellent acid and alkali resistance, and improving the application of renewable resources in the field of ink.

(3). The branched vegetable oil-based photosensitive resin and UV-cured glass ink additive bisphenol A-type epoxy resin provided by the present invention serve as thermosetting components and have a long pot life under the action of imidazole curing agents, can be quickly cured under heating conditions, and solidifies with the photosensitive resin into an interpenetrating network overall structure, jointly improving the adhesion of the ink on the glass substrate.

(4). Adhesion promoters are introduced into the ink, including acrylate-containing silane coupling agents, which can participate in free radical curing during the UV curing process. The amino silane coupling agent undergoes a Michael addition reaction with the photosensitive resin or active diluent to form a strong covalent bond. Under heating conditions, the silane coupling agent and the hydroxyl groups on the glass surface form a covalent bond through condensation, connecting the ink and the glass substrate into overall structure, further improving the adhesion of the ink on the substrate.

(5). The UV curing glass ink provided by the present invention can obtain a smooth, bubble-free ink layer after screen printing. It can be completely cured by irradiation under LED-UV light source for 3-5 seconds, and multiple colors can be overprinted. After heating, the ink pencil hardness is 5H; the adhesion is level 0; it is resistant to boiling water for 2 hours; and after soaking for 168 hours in acid and alkali solutions, there are no obvious bubbles, loss of gloss, discoloration, or falling off on the surface of the ink layer.

BRIEF DESCRIPTION OF THE DRAWINGS

The accompanying drawings are used to provide a further understanding of the present invention, and constitute a part of the description, and are used to explain the present invention together with the embodiments of the present invention, and do not constitute a limitation to the invention model. In the attached drawings.

DETAILED DESCRIPTION OF PREFERRED EMBODIMENTS

In order to make the purpose, technical solutions and advantages of the present invention clearer, the technical solutions in the present invention are described clearly and completely below. Obviously, the described embodiments are some of the embodiments of the present invention, rather than all the embodiments. Based on the embodiments of the present invention, all other embodiments obtained by those of ordinary skill in the art without making creative efforts fall within the scope of protection of the present invention.

Example 1 is a synthesis method of branched vegetable oil-based photosensitive resin (ESOD-IH).

Examples 2-6 are a preparing method of UV curing glass ink containing ESOD-IH photosensitive resin. Among them, ESOD-IH is a UV curing prepolymer, and epoxy resin is a thermosetting resin component, the two constitute the main body of UV curing and thermal curing. Comparative examples 1-2 are a preparing method of UV curing glass ink without ESOD-IH resin.

Example 1

Figure 2:
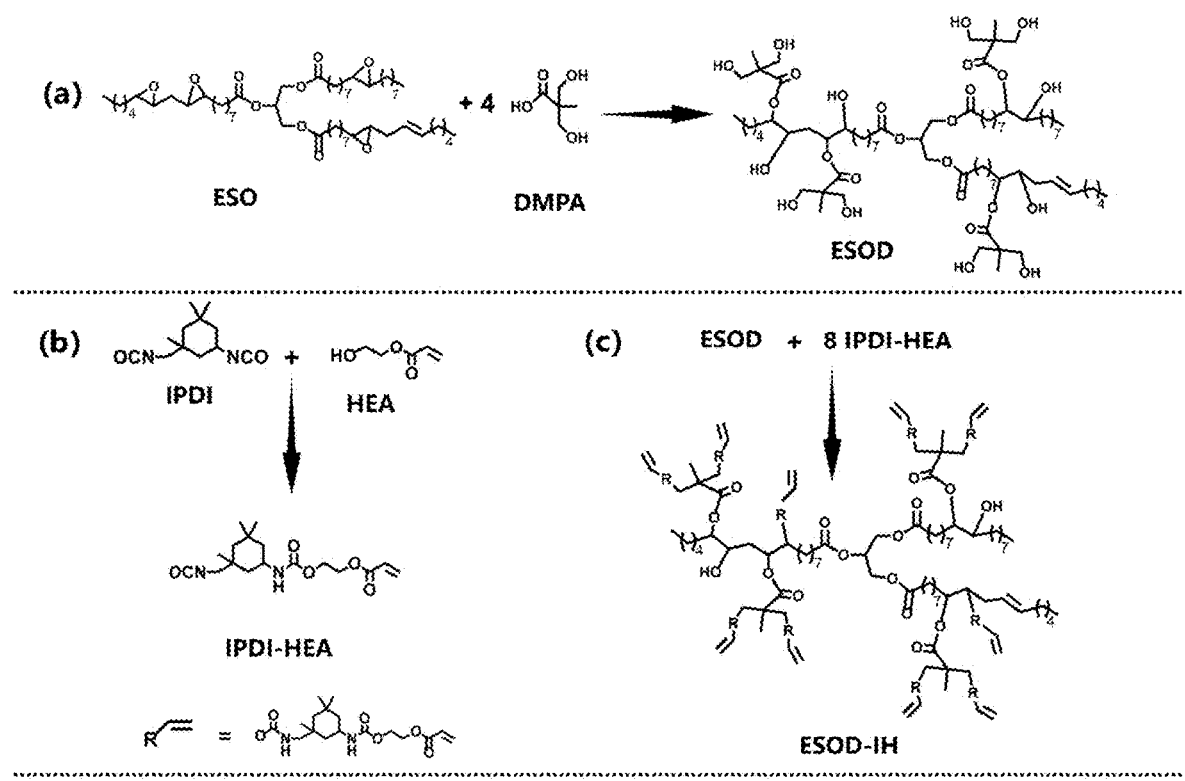
FIG. 2 is a schematic diagram of the synthesis steps of branched vegetable oil-based photosensitive resin (ESOD-IH)

As shown in FIG. 2, the branched vegetable oil-based photosensitive resin (ESOD-IH), its synthesis steps are as follows:

(a). Take 12.2 g epoxidized soybean oil (ESO), 6.71 g 2,2-bishydroxymethylpropionic acid (DMPA) and 0.06 g tetrabutylammonium bromide (TBAB) catalyst and put them into a three-necked bottle, stir mechanically, react in a constant temperature oil bath at 120° C. for 6-8 hours to obtain a brown viscous ESOD, which is dissolved in 20 g of 1,4-dioxane solvent to obtain an ESOD solution for later use;

(b). Take 22.23 g isophorone diisocyanate (IPID), 0.15 g p-hydroxyanisole, polymerization inhibitor, 0.02 g dibutyltin dilaurate catalyst and 30 g 1,4-dioxane and put them into a three-necked bottle. Add 11.61 g of hydroxyethyl acrylate (HEA) dropwise into the above reaction bottle through a constant pressure dropping funnel within 30 minutes, stir mechanically, vent nitrogen protection, and react in a constant temperature oil bath at 40° C. for 4 hours to obtain the intermediate product IPDI-HEA.

(c). Add the ESOD solution obtained from the reaction of step (a) dropwise into the reaction bottle of step (b) within 30 minutes through a constant pressure dropping funnel, raise the temperature to 70° C., continue the reaction for 5 hours under nitrogen protection, and rotate the solvent after evaporation, a reddish-brown transparent viscous liquid product is obtained, i.e, branched vegetable oil-based photosensitive resin (ESOD-IH).

Figure 1:
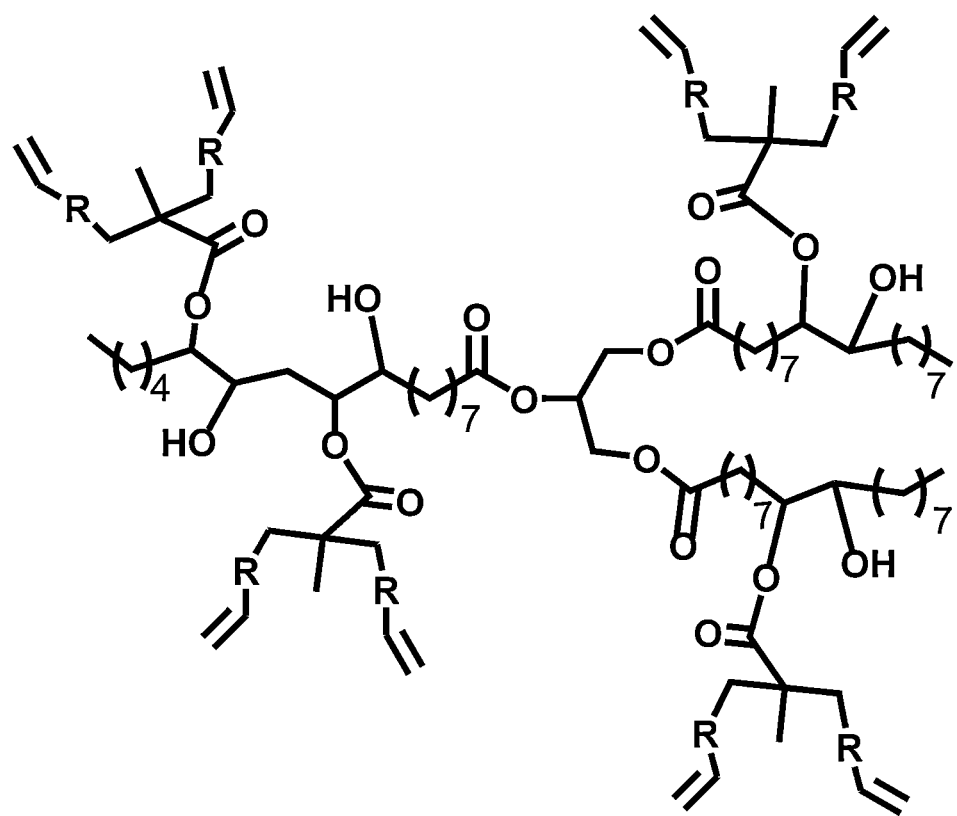
FIG. 1 is a is a schematic structural diagram of branched vegetable oil-based photosensitive resin (ESOD-IH)

The structure of the branched vegetable oil-based photosensitive resin (ESOD-IH) synthesized in example 1 is as follows: FIG. 1 shown.

Figure 3:
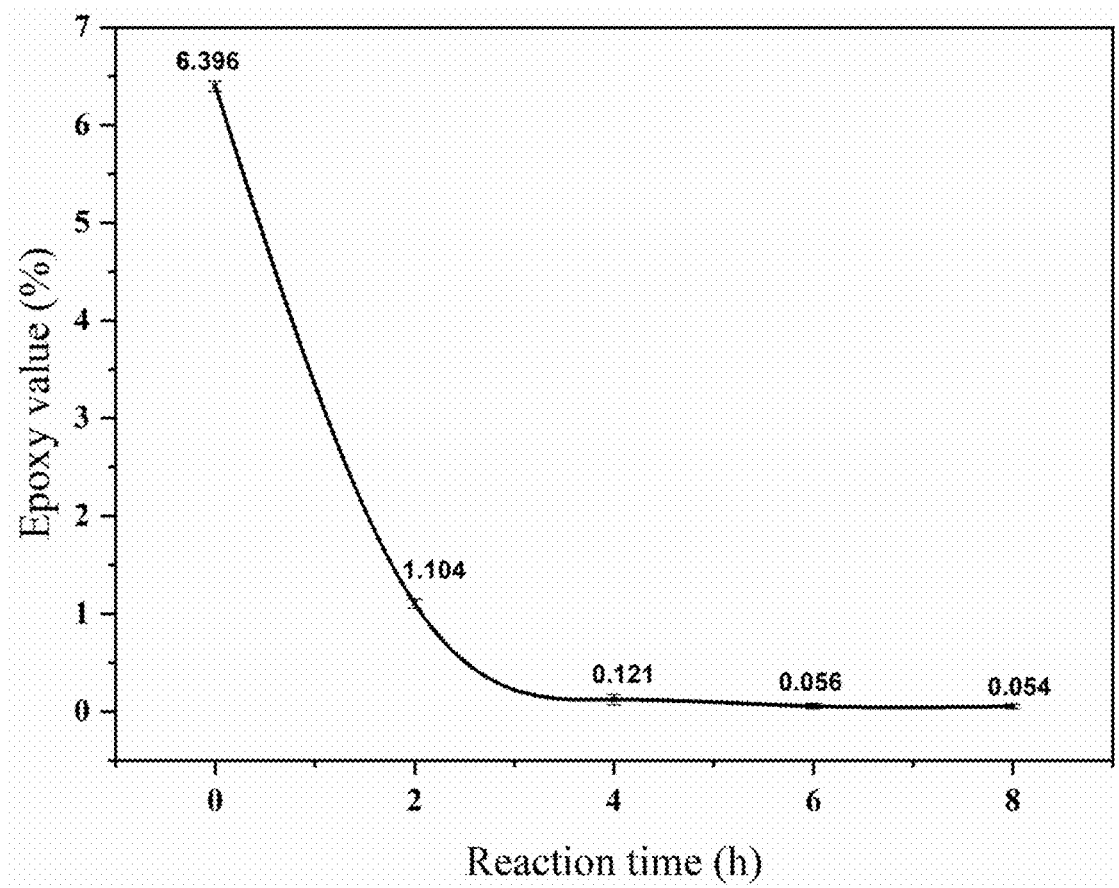
FIG. 3 is a graph showing the change of epoxy value of epoxidized soybean oil with reaction time.

In example 1, during the reaction between epoxidized soybean oil and 2,2-bishydroxymethylpropionic acid, the change in epoxy value is as shown in FIG. 3, by FIG. 3 it shows that when the reaction reaches 6 hours, the epoxy value drops to 0.056%, which is close to 0.054% at reaction 8 hours, indicating that the ring-opening reaction of epoxidized soybean oil in step (a) is completed in 6 hours.

Figure 4:
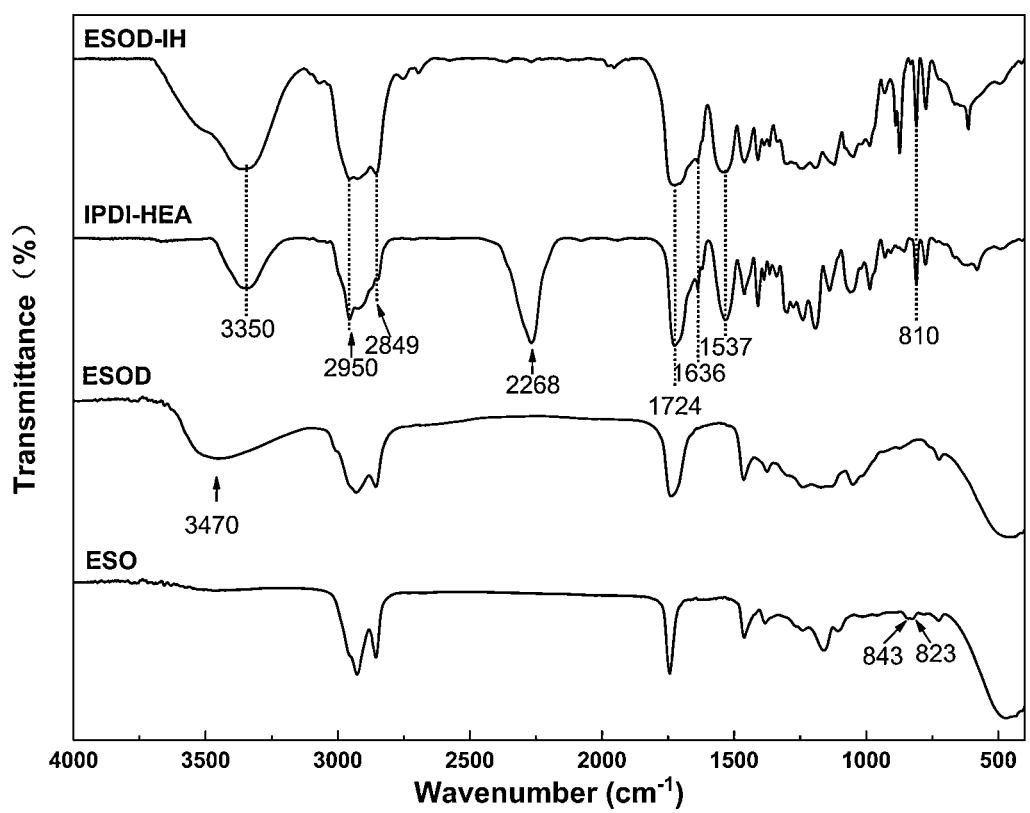
FIG. 4 is the infrared spectrum of branched vegetable oil-based photosensitive resin (ESOD-IH)

In example 1, as shown in the ESOD spectrum of FIG. 4, after the ring-opening reaction of ESO and DMPA, at 823 $cm^{-1}$ and 843 $cm^{-1}$ the epoxy group absorption peak represented disappeared, at 3470 $cm^{-1}$ characteristic absorption peak representing the hydroxyl group appeared, indicating that the reaction between epoxidized soybean oil and DMPA was complete and a multi-branched soybean oil-based polyol ESOD was generated. In the spectra of IPDI-HEA and ESOD-IH, the two places 3350 cm$^{-1}$ and 1537 cm$^{-1}$ are the stretching vibration and bending vibration absorption peaks of N—H, 1724 cm$^{-1}$ is the characteristic absorption peak of carbonyl group (C=O). The existence of these absorption peaks indicates that the carbamate group (—NH—COO—) is generated. In particular, 2952 cm$^{-1}$ and 2856 cm$^{-1}$ are C—H absorption peaks. The ESOD-IH curve does not find the characteristic absorption peak of —NCO at 2268 cm$^{-1}$, which proves that IPDI-HEA and ESOD have reacted completely. In addition, the ESOD-IH spectrum at 1636 cm$^{-1}$ and 810 cm$^{-1}$ appears the stretching vibration of the carbon-carbon double bond (C=C) on the acrylic group and the absorption peak of the C=C—H out-of-plane bending vibration, proving the existence of the acrylic group (CH$_2$=CH—COO). In ESOD curve at 3470 cm$^{-1}$ the hydroxyl absorption peak corresponding to significantly weakened after the reaction, indicating that the terminal hydroxyl group of ESOD did participate in the reaction and was consumed. In summary, the target product ESOD-IH has been successfully prepared.

Figure 5A:
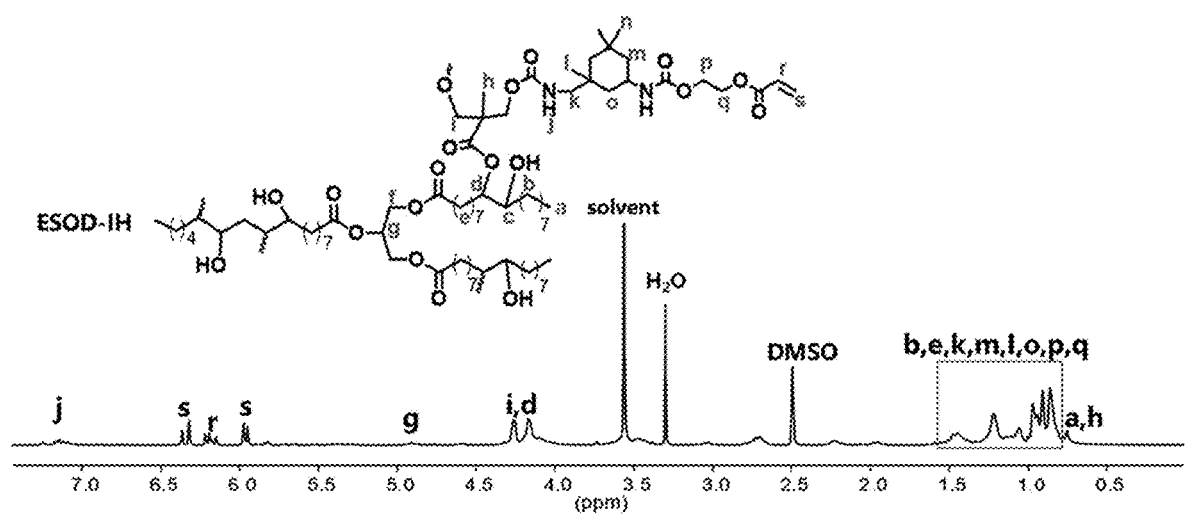
FIG. 5(a), FIG. 5(b), and FIG. 5(c) show hydrogen spectrum of branched vegetable oil-based photosensitive resin (ESOD-IH), branched soybean oil-based polyol (ESOD), and epoxidized soybean oil (ESO).
Figure 5B:
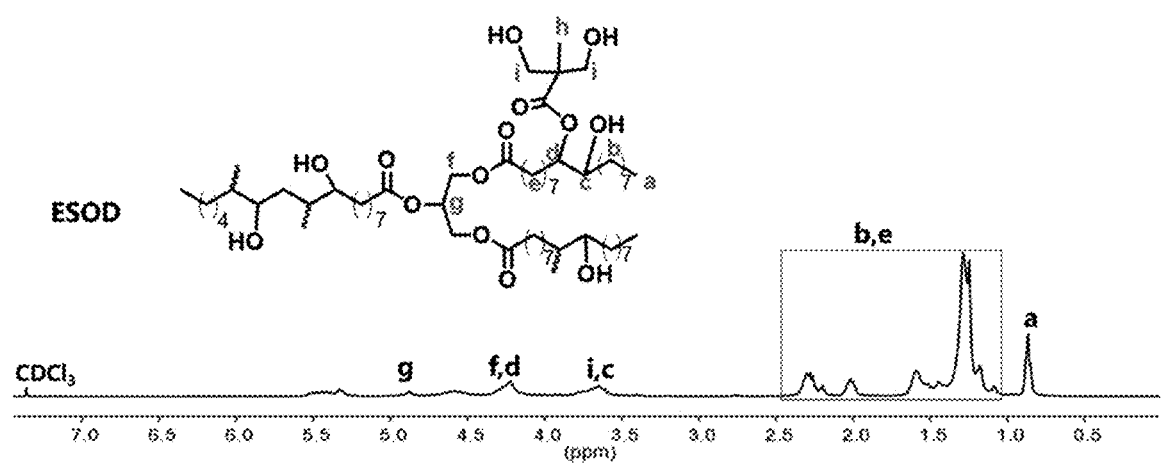
Figure 5C:
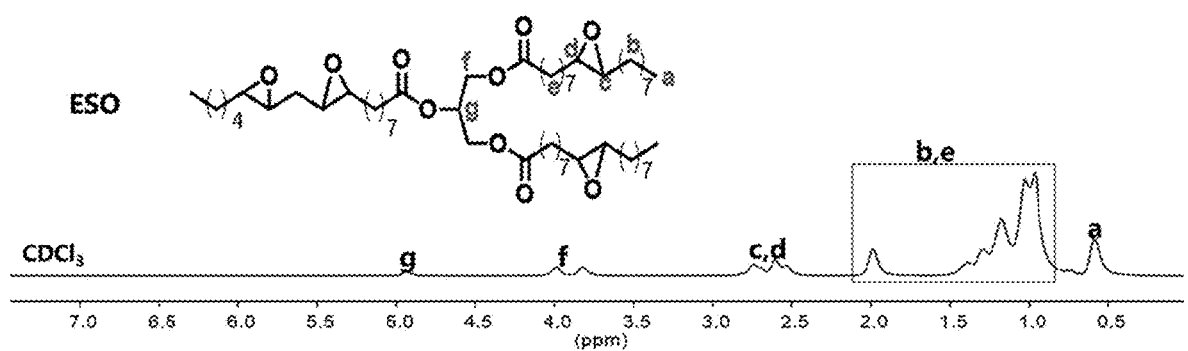

In example 1, as shown in the ESO hydrogen spectrum of FIG. 5(a)-FIG. 5(c), the chemical shift located at 2.6-2.8 ppm, which is the proton peak of the epoxy group. In the hydrogen energy spectra of ESOD and ESOD-IH, the proton peaks chemically located at 4.1-4.4 and 3.4-3.5 ppm are the proton peaks of methylene groups bonded to ester groups (—OCOCH2) and hydroxyl groups (—CH2OH). In the hydrogen energy spectrum of ESOD-IH, the proton peak with a chemical shift of 3.4-3.5 ppm becomes smaller sharply, indicating that the hydroxyl groups of ESOD are consumed by reacting with IPDI-HEA. In the hydrogen spectrum of ESOD-IH, a proton peak with a chemical shift located at 5.8-6.4 ppm appears. These three positions prove that the acrylic acid group (CH$_2$=CH—COO) was successfully introduced.

The above hydrogen spectrum characterization results and infrared characterization results corroborate each other, proving that the synthesized ESOD-IH structure is consistent with the expected structure.

Example 2

A preparing method of UV curing glass ink of branched vegetable oil-based photosensitive resin is introduced in this embodiment:
Prepare materials for ink component A.
Ink component A, based on mass g, contains the following components:

| | |
|---|---|
| branched vegetable oil-based photosensitive resin (ESOD-IH) | 35 g |
| active diluent (GMA) | 5 g |
| active diluent (IBOA) | 5 g |
| active diluent (TPGDA) | 5 g |
| active diluent (PETA) | 10 g |
| photoinitiator (819) | 3 g |
| photoinitiator (907) | 2 g |
| photoinitiator (DETX) | 1.5 g |
| photoinitiator (ODAB) | 2.5 g |
| adhesion promoter (PM2) | 2 g |
| auxiliary agent (BYK-361N) | 1.2 g |
| auxiliary agent (BYK-1799) | 1 g |
| auxiliary agent (BYK-111) | 0.8 g |
| epoxy resin (E51) | 5 g |
| pigments and fillers (Philip NT 36carbonblack) | 4 g |
| pigments and fillers (Polyethylene Wax) | 2 g |
| pigments and fillers (5000 mesh calcium carbonate) | 5 g |

The preparing method of ink A includes the following steps:
The following operations are performed in a darkroom:
(1) Add the branched vegetable oil-based photosensitive resin (ESOD-IH), active diluent, photoinitiator, adhesion promoter, auxiliary agent, and epoxy resin in the above formula into the container, and stir mechanically to obtain a uniform mixture liquid;
(2) Add the pigments and fillers of the above formula to the mixed solution in step (1), stir at low speed to disperse evenly, and transfer to a ceramic three-roller grinder to grind until the fineness reaches less than 5 μm;
(3) Divide the fluid paste obtained by grinding in step (2) into a black plastic jar and seal it for storage, that is, ink A.

Prepare materials for ink component B.
Ink component B, based on mass g, contains the following components:

| | |
|---|---|
| adhesion promoter (KH550) | 50 g |
| adhesion promoter (KH792) | 30 g |
| imidazole (2-ethyl-4-methylimidazole) | 15 g |
| imidazole (1-benzyl-2-ethylimidazole) | 5 g |

The preparing method of ink B includes the following steps:
Pour the adhesion promoter and imidazole compound in the above formula into the container according to the measured amount, stir mechanically until uniform, then divide into black plastic bottles for sealing and storage, which is component B.

When in use, ink component A and component B are mixed evenly at a mass ratio of 100:6 and allowed to stand for 5 minutes before being printed on the base material through a 300-400 mesh screen using an LED-UV light source with a wavelength of 395±10 nm, the optical power is 1500 mJ/cm$^2$, light curing for 3-5 s, and then baked at 160±10° C. for 20 min to obtain fully cured black ink.

Example 3

The preparing method of UV curing glass ink of branched vegetable oil-based photosensitive resin in this embodiment includes the following steps:
Prepare materials for ink component A
Ink component A, in terms of mass g, contains the following components:

| | |
|---|---|
| branched vegetable oil-based photosensitive resin (ESOD-IH) | 32.5 g |
| active diluent (GMA) | 5 g |
| active diluent (DMAA) | 4 g |
| active diluent (HDDA) | 13 g |
| active diluent (TMPTA) | 5 g |
| active diluent (PETA) | 5 g |
| photoinitiator (TP0) | 3 g |
| photoinitiator (369) | 2 g |
| photoinitiator (ITX) | 1 g |
| photoinitiator (EDAB) | 2 g |
| adhesion promoter (KH-570) | 2 g |
| auxiliary agent (TEGO-432) | 0.9 g |

-continued

| | |
|---|---|
| auxiliary agent (Disponer-983) | 1 g |
| auxiliary agent (Defom-2700) | 1.1 g |
| epoxy resin (E51) | 7.5 g |
| pigments and fillers (Polyethylene Wax) | 2 g |
| pigments and fillers (5000 mesh talc) | 7 g |

In this example, the preparing method of component A is the same as in example 2.

The materials used to prepare component B of the ink, in terms of mass g, contain the following components:

| | |
|---|---|
| adhesion promoter(KH550) | 45 g |
| adhesion promoter(KH792) | 35 g |
| imidazole(2-ethyl-4-methylimidazole) | 12.5 g |
| imidazole(1-aminoethyl-2-methylimidazole) | 7.5 g |

In this example, the preparing method of component B is the same as in example 2.

When in use, the ink A component and the ink B component are mixed evenly in a mass ratio of 100:7 and then left to stand for 5 minutes before being printed on the substrate material through a 300-400 mesh screen, using an LED-UV light source with a wavelength of 395±10 nm, the optical power is 1500 mJ/cm$^2$, light curing for 3-5 s, and then baked at 160±10° C. for 20 min to obtain fully cured purple ink.

Example 4

The preparing method of UV curing glass ink of branched vegetable oil-based photosensitive resin in this embodiment includes the following steps:
Prepare Materials for Ink Component A
Ink component A, in terms of mass g, contains the following components:

| | |
|---|---|
| branched vegetable oil-based photosensitive resin (ESOD-IH) | 30 g |
| active diluent (GMA) | 5 g |
| active diluent (ACMO) | 4 g |
| active diluent (HDDA) | 12 g |
| active diluent (TMPTA) | 5 g |
| active diluent (PETA) | 7 g |
| photoinitiator (TPO) | 3 g |
| photoinitiator (369) | 2 g |
| adhesion promoter (PM-1) | 2 g |
| auxiliary agent (TEGO-2100) | 1 g |
| auxiliary agent (TEGO-681) | 1 g |
| epoxy resin (E51) | 10 g |
| pigments and fillers (permanent P.R254) | 7 g |
| pigments and fillers (Polyethylene Wax) | 2 g |
| pigments and fillers (5000 mesh talc) | 8 g |

In this example, the preparing method of component A is the same as in example 2.
Prepare Materials for Ink Component B
In terms of mass g, the ink component B includes the following components:

| | |
|---|---|
| adhesion promoter(KH540) | 40 g |
| adhesion promoter(KH791) | 40 g |
| imidazole(1-cyanoethyl-2-ethyl-4-methylimidazole) | 12.5 g |
| imidazole(1-benzyl-2-ethylimidazole) | 7.5 g |

In this example, the preparing method of component B is the same as in Example 2.

When in use, ink component A and component B are mixed evenly in a mass ratio of 100:8 and then left to stand for 5 minutes before being printed on the substrate material through a 300-400 mesh screen using an LED-UV light source with a wavelength of 395±10 nm, the optical power is 1500 mJ/cm$^2$, light curing for 3-5 s, and then baked at 160±10° C. for 20 min to obtain fully cured red ink.

Example 5

The preparing method of UV curing glass ink of branched vegetable oil-based photosensitive resin in this embodiment includes the following steps:
Prepare Materials for Ink Component A
Ink component A, in terms of mass g, contains the following components:

| | |
|---|---|
| branched vegetable oil-based photosensitive resin (ESOD-IH) | 27.5 g |
| active diluent (GMA) | 5 g |
| active diluent (IBOA) | 4 g |
| active diluent (TPGO) | 12 g |
| active diluent (PETA) | 12 g |
| photoinitiator (TP0) | 3 g |
| photoinitiator (369) | 2 g |
| adhesion promoter (KH-570) | 1.5 g |
| adhesion promoter (PM-2) | 1.5 g |
| auxiliary agent (TEGO-2100) | 1 g |
| auxiliary agent (TEGO-685) | 1 g |
| auxiliary agent (TEGO-900) | 1 g |
| epoxy resin (E51) | 12.5 g |
| pigments and fillers (phthalo blue) | 6 g |
| pigments and fillers (Polyethylene Wax) | 2 g |
| pigments and fillers (5000 mesh talc) | 8 g |

In this example, the preparing method of component A is the same as in example 2.
Prepare materials for ink component B
Ink component B, in terms of mass g, contains the following components:

| | |
|---|---|
| adhesion promoter(KH540) | 35 g |
| adhesion promoter(KH791) | 25 g |
| imidazole(1-cyanoethyl-2-ethyl-4-methylimidazole) | 15 g |
| imidazole(1-aminoethyl-2-methylimidazole) | 5 g |

In this example, the preparing method of component B is the same as in example 2.

When in use, ink component A and component B are mixed evenly in a mass ratio of 100:8 and then left to stand for 5 minutes before being printed on the substrate material through a 300-400 mesh screen using an LED-UV light source with a wavelength of 395±10 nm, the optical power is 1500 mJ/cm$^2$, light curing for 3-5 s, and then baked at 160±10° C. for 20 min to obtain fully cured blue ink.

Example 6

The preparing method of UV curing glass ink of branched vegetable oil-based photosensitive resin in this embodiment includes the following steps:
Prepare Materials for Ink Component A
Ink component A, in terms of mass g, contains the following components:

| | |
|---|---|
| branched vegetable oil-based photosensitive resin (ESOD-IH) | 30 g |

-continued

| | |
|---|---|
| active diluent (GMA) | 5 g |
| active diluent (ACMO) | 4 g |
| active diluent (HDDA) | 8 g |
| active diluent (TMPTA) | 4 g |
| active diluent (PETA) | 6 g |
| photoinitiator (819) | 3 g |
| photoinitiator (184) | 2 g |
| photoinitiator (ITX) | 0.8 g |
| photoinitiator (EDAB) | 1.2 g |
| adhesion promoter (PM-1) | 2 g |
| auxiliary agent (TEGO-2100) | 1 g |
| auxiliary agent (TEGO-681) | 1 g |
| auxiliary agent (EFKA-2720) | 1 g |
| epoxy resin (E54) | 10 g |
| pigments and fillers (Rutile titanium dioxide powder) | 19 g |
| pigments and fillers (Polyethylene Wax) | 2 g |

In this example, the preparing method of component A is the same as in example 2.

Prepare Materials for Ink Component B

In terms of mass g, the ink component B includes the following components:

| | |
|---|---|
| adhesion promoter(KH540) | 40 g |
| adhesion promoter(KH791) | 40 g |
| imidazole(1-cyanoethyl-2-ethyl-4-methylimidazole) | 12.5 g |
| imidazole(1-benzyl-2-ethylimidazole) | 7.5 g |

In this example, the preparing method of component B is the same as in example 2.

When in use, ink component A and component B are mixed evenly in a mass ratio of 100:8 and then left to stand for 5 minutes before being printed on the substrate material through a 300-400 mesh screen using an LED-UV light source with a wavelength of 395±10 nm, the optical power is 1500 mJ/cm$^2$, light curing for 3-5 s, and then baked at 160±10° C. for 20 min to obtain fully cured white ink.

Comparative Example 1

In comparative example 1, component A does not contain branched vegetable oil-based photosensitive resin, and component A of the ink contains the following components in terms of mass g:

Prepare Materials for Component A of Ink

| | |
|---|---|
| Epoxy soybean oil acrylate (AESO) | 35 g |
| active diluent (GMA) | 5 g |
| active diluent (TPGDA) | 15 g |
| active diluent (PETA) | 11 g |
| photoinitiator (819) | 3 g |
| photoinitiator (907) | 1.5 g |
| photoinitiator (DETX) | 1.5 g |
| photoinitiator (ODAB) | 2 g |
| adhesion promoter (PM2) | 2 g |
| auxiliary agent (BYK-361N) | 1.2 g |
| auxiliary agent (BYK-1799) | 1 g |
| auxiliary agent (BYK-111) | 0.8 g |
| epoxy resin (E51) | 10 g |
| pigments and fillers (Philip NT 36 carbonblack) | 4 g |
| pigments and fillers (Polyethylene Wax) | 2 g |
| pigments and fillers (5000 mesh calcium carbonate) | 5 g |

In comparative example 1, the preparing method of component A is the same as that of example 2.

Prepare Materials for B Ink Component

Ink component B, in terms of mass g, contains the following components:

| | |
|---|---|
| adhesion promoter(KH540) | 40 g |
| adhesion promoter(KH791) | 40 g |
| imidazole(1-cyanoethyl-2-ethyl-4-methylimidazole) | 12.5 g |
| imidazole(1-benzyl-2-ethylimidazole) | 7.5 g |

In comparative example 1, the preparing method of component B is the same as that of example 2.

When in use, ink component A and component B are mixed evenly in a mass ratio of 100:8 and then left to stand for 5 minutes before being printed on the base material through a 300-400 mesh screen using an LED-UV light source with a wavelength of 395±10 nm, the optical power is 1500 mJ/cm$^2$, light curing for 3-5 s, and then baked at 160±10° C. for 20 min to obtain fully cured black ink.

Comparative Example 2

In comparative example 2, component A does not contain branched vegetable oil-based photosensitive resin, and component A of the ink contains the following components in terms of mass g:

Prepare Materials for Ink Component A:

| | |
|---|---|
| Epoxy soybean oil acrylate (Zhongshan Ketian 4210EA) | 35 g |
| active diluent (GMA) | 5 g |
| active diluent (IBOA) | 5 g |
| active diluent (TPGDA) | 12 g |
| active diluent (PETA) | 9 g |
| photoinitiator (819) | 3 g |
| photoinitiator (907) | 2 g |
| photoinitiator (DETX) | 1.5 g |
| photoinitiator (ODAB) | 1.5 g |
| adhesion promoter (PM2) | 2 g |
| auxiliary agent (BYK-361N) | 1.2 g |
| auxiliary agent (BYK-1799) | 1 g |
| auxiliary agent (BYK-111) | 0.8 g |
| epoxy resin (E51) | 10 g |
| pigments and fillers (Philip NT 36 carbonblack) | 4 g |
| pigments and fillers (Polyethylene Wax) | 2 g |
| pigments and fillers (5000 mesh calcium carbonate) | 5 g |

In comparative example 2, the preparing method of component A is the same as that of Example 2.

Prepare Materials for B Ink Component

Ink component B, in terms of mass g, contains the following components:

| | |
|---|---|
| adhesion promoter(KH540) | 40 g |
| adhesion promoter(KH791) | 40 g |
| imidazole(1-cyanoethyl-2-ethyl-4-methylimidazole) | 12.5 g |
| imidazole(1-benzyl-2-ethylimidazole) | 7.5 g |

In comparative example 2, the preparing method of component B is the same as that of Example 2.

When in use, ink component A and component B are mixed evenly in a mass ratio of 100:8 and then left to stand for 5 minutes before being printed on the base material through a 300-400 mesh screen using an LED-UV light source with a wavelength of 395±10 nm, the optical power is 1500 mJ/cm$^2$, light curing for 3-5 s, and then baked at 160±10° C. for 20 min to obtain fully cured black ink.

Test Methods:

The UV curing glass ink prepared in examples 2-6 and comparative examples 1-2 was screen-printed on the glass substrate. After curing, it was left at room temperature for 24 hours to perform performance testing.

Pencil hardness test: refer to GB/T6739-1996 "Pencil Measurement Method for Paint Film Hardness", use Chinese pencils, the hardness gradually decreases from 6H to 6B, starting from the hardest pencil until the marks made by the pencil do not damage the ink, the hardness of this pencil represents the pencil hardness of the ink layer.

Adhesion test, refer to GB/T9286-2021 "Cross-cut test of paints and varnishes", use the hundred-grid knife method, cut out a cross grid pattern with a spacing of 1 mm, cut until the base material, brush 5 times in each diagonal direction with a brush, stick 3M tape on the incision and then pull it open, observe the condition of the grid area, and judge the grade according to the area ratio of the ink falling off from the substrate. There are six levels, level 0 is the best grade, and level 5 is the worst. The edge of the incision is completely smooth and there is no peeling on the edge of the grid, which is level 0; the peeling area is less than 5%, which is level 1; the peeling area is 5-15%, which is level 2; the peeling area is 15-35%, which is level 3; If the shedding area is 35-65%, it is level 4; if the shedding area is greater than 65%, it is level 5.

Boiling water resistance test: dip the ink sample cured on the glass sheet into boiling water for 2 hours and then take it out. Observe whether there are bubbles, loss of gloss, discoloration, or peeling off on the surface of the ink. Use filter paper to absorb the liquid on the surface of the ink layer, bake it at 60° C. for 1 hour, then lower it to room temperature and test its adhesion.

Dip the ink sample cured on the glass sheet into 0.1% NaOH solution and add $Ca(OH)_2$ to reach the supersaturated state, take it out after continuous soaking for 168 hours and observe whether there is bubbling, loss of gloss, discoloration, or falling off on the ink surface. Use filter paper to absorb the liquid on the surface of the ink layer, bake it at 60° C. for 1 hour, then lower it to room temperature and test its adhesion.

The test results are shown in Table 1 and Table 2.

TABLE 1

Performance test results of the inks of Examples 2-6 and Comparative Examples 1-2

| Test | Example 2 | Example 3 | Example 4 | Example 5 | Example 6 | Comparative example 1 | Comparative example 2 |
|---|---|---|---|---|---|---|---|
| Pencil hardness | 4H | 5H | 5H | 5H | 5H | 3H | 5H |
| Adhesion | level 0 | level 0 | level 0 | level 0 | level 0 | level 1 | level 0 |
| Ink surface | flat, smooth | flat, smooth | flat, smooth | flat, smooth | flat, smooth | flat, smooth | flat, smooth |

TABLE 2

Boiling water resistance, acid and alkali resistance test results of the inks of Examples 2-6 and Comparative Examples 1-2

| Test | | Example 2 | Example 3 | Example 4 | Example 5 | Example 6 | Comparative example 1 | Comparative example 2 |
|---|---|---|---|---|---|---|---|---|
| Adhesion | Resist boiling water | Level 2 | Level 1 | Level 0 | Level 0 | Level 0 | 5 | 3 |
| | Resist acid | Level 1 | Level 1 | Level 0 | Level 0 | Level 0 | 4 | 2 |
| | Resist alkali | Level 1 | Level 1 | Level 0 | Level 0 | Level 0 | 4 | 2 |
| Ink surface | Resist boiling water | No obvious change | No obvious change | No obvious change | No obvious change | No obvious change | bubbling, peeling off | no peeling on the edge |
| | Resist acid | No obvious change | No obvious change | No obvious change | No obvious change | No obvious change | bubbling, loss of gloss | No obvious change |
| | Resist alkali | No obvious change | No obvious change | No obvious change | No obvious change | No obvious change | bubbling, loss of gloss | No obvious change |

It can be seen from the data in Table 1 that according to the preparing method of UV curing glass ink of branched vegetable oil-based photosensitive resin of the present invention, the pencil hardness of the ink prepared by using ESOD-IH photosensitive resin as the ink linking material can be as high as 5H, with outstanding adhesion and uniformity, reaching level 0, the hardness and adhesion properties are equivalent to those of inks prepared using EA resin as ink linking material, and are superior to inks prepared with AESO resin as ink linking material.

It can be seen from the data in Table 2 that the UV curing glass ink of the branched vegetable oil-based photosensitive resin of the present invention has no obvious changes in the surface of the ink after the boiling water resistance and acid and alkali resistance tests, and no bubbling, loss of gloss, discoloration, or shedding has been observed, the adhesion can reach level 2, among which Examples 3-6 reach level 0, and the comprehensive performance is significantly better than Comparative Example 1 and Comparative Example 2.

The invention provides a method for preparing branched vegetable oil-based photosensitive resin UV-cured glass ink by preparing soybean-based polyol (ESOD) in one step through a solvent-free method, introducing a photosensitive group for modification, and obtaining a branched vegetable oil-based photosensitive resin (ESOD-IH), the synthesis process is simple, the yield is high, and it is conducive to industrial production. A branched vegetable oil-based photosensitive resin is used as the ink binder, this resin has the inherent flexibility of vegetable oil molecular segments, and at the same time has the high activity and increased cross-linking density of multifunctional polyurethane acrylate photosensitive resin, especially the introduction of A large number of urethane bonds are beneficial to improving the toughness, hardness and adhesion of the ink, giving the ink excellent acid and alkali resistance, and improving the application of renewable resources in the field of ink.

The UV curing glass ink additive bisphenol A-type epoxy resin of the branched vegetable oil-based photosensitive resin provided by the invention serves as the thermosetting component. Under the action of the imidazole curing agent, it has a long application period and can be cured quickly under heating conditions, and cured and solidified with the photosensitive resin into an interpenetrating network structure to jointly improve the adhesion of the ink on the glass substrate. The UV curing glass ink of the branched vegetable oil-based photosensitive resin provided by the present invention introduces an adhesion promoter, in which the acrylate-containing silane coupling agent can participate in free radical curing during the UV curing process; and Michael addition reaction occurs between the amino silane coupling agent and photosensitive resin or active diluent to form a strong covalent bond. Under heating conditions, the silane coupling agent and the hydroxyl group on the glass surface form a covalent bond through condensation to connect the ink to the glass substrate. As a whole, the adhesion of the ink on the substrate is further improved The UV curing glass ink of branched vegetable oil-based photosensitive resin provided by the invention can be screen-printed to obtain a smooth and flat ink layer. It can be completely cured under LED-UV light source for 3-5 seconds and can be overprinted with multiple colors. After heating, the pencil hardness of the ink is 5H; the adhesion is level 0; it is resistant to boiling water for 2 hours and acid and alkali solutions, and after soaking for 168 hours, there is no obvious bubbling, loss of gloss, discoloration, or peeling off on the surface of the ink layer.

Finally, it should be noted that the above embodiments are only used to illustrate the technical solution of the present invention, but not to limit it; although the present invention has been described in detail with reference to the foregoing embodiments, those of ordinary skill in the art should understand that it can still be used Modifications are made to the technical solutions described in the foregoing embodiments, or equivalent substitutions are made to some of the technical features; however, these modifications or substitutions do not cause the essence of the corresponding technical solutions to deviate from the spirit and scope of the technical solutions of the embodiments of the present invention.

What is claimed is:

1. A preparing method for UV curing glass ink of branched vegetable oil-based photosensitive resin, comprising the following steps 1-5:
   step 1, prepare material for component A ink, in terms of mass g, the component A ink comprising the following components:
   branched vegetable oil-based photosensitive resin 25-35 g;
   active diluent 20-35 g;
   photoinitiator 5-10 g;
   adhesion promoter 1-4 g;
   auxiliary agent 2-4 g;
   epoxy resin 5-15 g; and
   pigment and filler with a total amount 10-20 g;
   step 2, preparation of component A, comprising the following operations comprising steps 201-203 performed in a darkroom:
   step 201, add the branched vegetable oil-based photosensitive resin, active diluent, photoinitiator, adhesion promoter, auxiliary agent, and epoxy resin in step 1 into a container, and stir mechanically to obtain a uniform mixed solution;
   step 202, add the pigment and filler in step 1 to the mixed solution in step 201, stir at a speed to disperse evenly, and transfer to a ceramic three-roller grinder to grind until a fineness thereof is less than 5 μm; and
   step 203, divide a fluid paste obtained by grinding in step 202 into a black plastic jar for sealing and storage, obtaining component A;
   step 3, prepare material for component B ink, in terms of mass g, the component B ink comprising the following components:
   adhesion promoter 80 g; and
   imidazole 20 g;
   step 4, prepare component B, comprising the following steps:
   add the adhesion promoter and imidazole in step 3 into the container according to the measured amount, stir mechanically until uniform, then divide into a black plastic bottle for sealing and storage, obtaining component B; and
   step 5, prepare UV curing glass ink;
   in preparation, component A and component B are mixed evenly in a mass ratio of 100:5-8 and left to stand for 5 minutes, then are printed on a substrate material with a 300-400 mesh screen, using an LED-UV light source with a wavelength of 395±10 nm, the optical power is 1500 mJ/cm$^2$, light curing for 3-5 s, and then baked at 160±10° C. for 20 min to obtain fully cured ink;
   wherein, the branched vegetable oil-based photosensitive resin is prepared by the following steps (1)-(3):
   step (1), put 12.2 g epoxidized soybean oil, 6.71 g 2,2-bishydroxymethylpropionic acid and 0.06 g tetrabutylammonium bromide catalyst into a three-necked bottle, stir mechanically, and react in a constant temperature oil bath at 120° C. for 6-8 hours, a brown viscous substance is obtained, which is dissolved in 20 g of 1,4-dioxane solvent to obtain a solution for later use;

step (2), take 22.23 g isophorone diisocyanate, 0.15 g p-hydroxyanisole, polymerization inhibitor, 0.02 g dibutyltin dilaurate catalyst and 30 g 1,4-dioxane and put into a three-necked bottle, then 11.61 g of hydroxyethyl acrylate was added dropwise into the reaction bottle through a constant pressure dropping funnel within 30 minutes, stirred mechanically, protected by nitrogen, and reacted in a constant temperature oil bath at 40° C. for 4 hours to obtain an intermediate product;

step (3), add the solution obtained by the reaction in step (1) dropwise into the reaction bottle of step (2) within 30 minutes through a constant pressure dropping funnel, raise the temperature to 70° C., continue the reaction for 5 hours under nitrogen protection, and rotary evaporate the solvent, finally, a reddish-brown transparent viscous liquid product is obtained, that is a branched vegetable oil-based photosensitive resin is obtained;

the branched vegetable oil-based photosensitive resin, its structural formula is as follows:

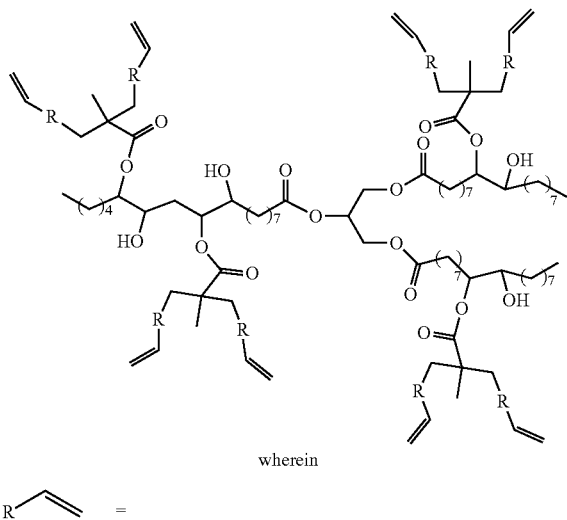

wherein

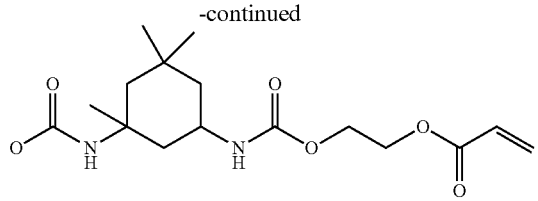

the adhesion promoter comprises one or two of 2-hydroxyethyl methacrylate phosphate, 2-hydroxyethyl methacrylate phosphate, γ-methacryloyloxypropyltrimethoxysilane, γ-amine propyltriethoxysilane, γ-aminopropyltrimethoxysilane, N-β-(aminoethyl)γ-aminopropyltriethoxysilane coupling agent, and N-β-(aminoethyl)γ-aminopropyltrimethoxysilane coupling agents; and the epoxy resin is bisphenol A type epoxy resin.

2. The preparing method according to claim 1, wherein the active diluent comprises two or more of isobornyl acrylate, N,N-dimethylacrylamide, acryloylmorpholine, glycidyl methacrylate, 1,6-ethylene glycol diacrylate, tripropylene glycol diacrylate, trimethylolpropane triacrylate, and pentaerythritol triacrylate.

3. The preparing method according to claim 1, wherein the photoinitiator comprises two or more of phenyl bis(2,4,6-trimethylbenzoyl) phosphine oxide, 1-hydroxycyclohexyl phenyl ketone, 2,4,6-trimethylbenzoyl bis phenylphosphine oxide, 2-methyl-1-4(4-methylmercaptophenyl)-2-2morpholine-1-propanone, 2-benzyl-2-dimethylamino-1-1(4-methyl phosphinobenzyl)-1-(4-morpholinophenyl)-1-butanone, 2,4-diethylthiaxanthone, isopropylthiaxanthone, N,N-dimethylbenzoic acid, ethyl ester and N,N-dimethylbenzoate-2-ethylhexyl.

4. The preparing method according to claim 1, wherein the auxiliary agent comprises defoaming agents, wetting and dispersing agents and leveling agents.

5. The preparing method according to claim 1, wherein the pigment and filler is a toner comprising one or two of permanent yellow, permanent orange, permanent purple, phthalocyanine blue, permanent red, and phthalocyanine green, high-pigment carbon black, rutile titanium dioxide, talc powder, calcium carbonate powder, and high-molecular polyethylene wax.

6. The preparing method according to claim 1, wherein the imidazole is one of 2-ethyl-4-methylimidazole, 1-cyanoethyl-2-ethyl-4-methylimidazole, 1-benzyl-2-ethylimidazole and 1-aminoethyl-2-methylimidazole, or a combination of any two thereof.

* * * * *